US012760525B2

(12) United States Patent
Tiefry

(10) Patent No.: US 12,760,525 B2
(45) Date of Patent: Oct. 13, 2026

(54) TELESCOPING WINDOW COVER SYSTEM FOR SIMULTANEOUSLY MAINTAINING PRIVACY AND ENABLING SUNLIGHT

(71) Applicant: Martha Tiefry, Chandler, AZ (US)

(72) Inventor: Martha Tiefry, Chandler, AZ (US)

( * ) Notice: Subject to any disclaimer, the term of this patent is extended or adjusted under 35 U.S.C. 154(b) by 103 days.

(21) Appl. No.: 18/668,385

(22) Filed: May 20, 2024

(65) Prior Publication Data

US 2024/0401401 A1 Dec. 5, 2024

Related U.S. Application Data

(60) Provisional application No. 63/505,170, filed on May 31, 2023.

(51) Int. Cl.

*E06B 9/24* (2006.01)
*E04F 10/00* (2006.01)
*E04F 10/10* (2006.01)

(52) U.S. Cl.

CPC ............ *E04F 10/005* (2013.01); *E04F 10/10* (2013.01); *E06B 9/24* (2013.01)

(58) Field of Classification Search

CPC ..... E04F 10/0603; E04F 10/005; E04F 10/00; E04F 10/10; E04F 10/08; E04F 10/0625; E04F 10/0633; E04F 10/0684; E06B 2009/005; E06B 9/04; E06B 2009/2417; E06B 9/92; E06B 7/02

See application file for complete search history.

(56) References Cited

U.S. PATENT DOCUMENTS

| | | | | |
|---|---|---|---|---|
| 271,146 | A * | 1/1883 | Stearns | E06B 7/02 160/52 |
| 1,434,075 | A * | 10/1922 | Van Schooneveld | F21S 11/00 359/597 |
| 1,476,464 | A * | 12/1923 | Poulsen | E04F 10/0603 160/71 |
| 3,203,468 | A | 8/1965 | Gossling | |
| 4,184,295 | A * | 1/1980 | Hicks | E04F 10/00 52/64 |
| 4,309,981 | A * | 1/1982 | Briggs | F24S 20/63 126/633 |

(Continued)

*Primary Examiner* — Abe Massad

(74) *Attorney, Agent, or Firm* — Brennan, Manna & Diamond, LLC

(57) ABSTRACT

A window cover system and control system designed to provide selective control over sunlight entry and privacy for buildings. The window cover system comprises a planar glass window cover, precisely shaped to overlap a window, with frame brackets for secure attachment to the window frame. The system includes upper and lower telescoping arms, controlled by an integrated control box within the building, enabling automatic extension and retraction of the arms. The control box enables the transition of the window cover between an overlapping position and an inclined position. In the inclined position, the window frame makes approximately 45 degree angle relative to the window frame, enabling sunlight and fresh air while maintaining privacy. Users can selectively extend or retract the arms to achieve different positions, including the inclined position, parallel position, or any desired configuration, effectively managing sunlight penetration and privacy levels within the building.

17 Claims, 6 Drawing Sheets

(56) References Cited

U.S. PATENT DOCUMENTS

| | | | | |
|---|---|---|---|---|
| 4,448,187 | A * | 5/1984 | Stulken | F24S 20/61 126/684 |
| 4,823,823 | A * | 4/1989 | Gallery | E04H 1/1222 135/96 |
| 5,980,052 | A * | 11/1999 | Thor | F21S 11/005 126/573 |
| 7,055,890 | B1 * | 6/2006 | Crean | B60P 3/343 296/180.1 |
| 9,631,421 | B2 | 4/2017 | Cheng | |
| 9,932,768 | B2 * | 4/2018 | Valinejadshoubi | H02S 40/38 |
| 2003/0159373 | A1 * | 8/2003 | Lien | E06B 9/02 52/213 |
| 2009/0032100 | A1 * | 2/2009 | Oak | F24S 20/66 160/22 |
| 2011/0024065 | A1 | 2/2011 | Lin | |
| 2012/0060436 | A1 * | 3/2012 | Zimmer, II | F41H 5/24 52/741.3 |
| 2012/0144743 | A1 * | 6/2012 | Piney | E06B 9/04 49/31 |
| 2014/0290157 | A1 * | 10/2014 | Wilson | F24S 20/63 52/173.3 |
| 2016/0130869 | A1 | 5/2016 | Cheng | |
| 2016/0273225 | A1 * | 9/2016 | Giglio | E04F 10/04 |
| 2017/0336104 | A1 * | 11/2017 | Tenghoff | E04F 10/00 |
| 2020/0056424 | A1 * | 2/2020 | Farnes | E04D 13/0358 |

* cited by examiner

TELESCOPING WINDOW COVER SYSTEM FOR SIMULTANEOUSLY MAINTAINING PRIVACY AND ENABLING SUNLIGHT

CROSS-REFERENCE TO RELATED APPLICATION

The present application claims priority to, and the benefit of, U.S. Provisional Application No. 63/505,170, which was filed on May 31, 2023, and is incorporated herein by reference in its entirety.

FIELD OF THE INVENTION

The present invention generally relates to the field of window covering systems. More specifically, the present invention relates to a novel window cover system to provide privacy and selective control over sunlight entry for buildings. The system includes a window cover connected to a window frame using telescoping arms. A control box selectively controls the extension and retraction of the telescoping arms to enable the window cover to be in different positions, including the inclined position, parallel position, or any desired configuration, effectively managing sunlight penetration and privacy levels within the building. Accordingly, the present disclosure makes specific reference thereto. Nonetheless, it is to be appreciated that aspects of the present invention are also equally applicable to other like applications, devices, and methods of manufacture.

BACKGROUND

By way of background, windows are necessary for both residential homes and office buildings. Windows enable natural light to enter indoor spaces and provide a means for fresh air to enter a building. Proper ventilation is essential for maintaining indoor air quality, regulating temperature, and removing pollutants or odors. Windows are also an integral part of a building's design and aesthetics. Modern windows are also designed to be energy-efficient, helping to insulate buildings and reduce heating and cooling costs.

While windows are essential for natural light and ventilation, they can also present challenges regarding privacy. Windows are generally transparent or translucent which enables individuals from outdoors to look through the window. Individuals use window treatments or covers, such as blinds and curtains to maintain privacy. Window treatments provide a barrier between the indoor space and the outdoors and provide a barrier to the sunlight as well.

However, to let sunlight and fresh air in through the window, individuals commonly pull back blinds and curtains. Pulling window treatments provides a risk of lack of privacy. When window treatments are pulled back, the interior space is exposed and individuals from outside can easily view through the window. As a result, individuals have to compromise their privacy while letting in sunlight and fresh air. In conventional window cover devices, individuals have an option to choose only one of the privacy and weather elements such as sunlight and air. Therefore, individuals desire an improved window cover that maintains privacy of the interior space of a building while letting in sunlight and fresh air through the window.

Therefore, there exists a long-felt need in the art for an improved window cover system that helps in maintaining a trade-off between maintaining privacy and enjoying natural sunlight. Additionally, there is a long-felt need in the art for a window cover system that effectively blocks the line of sight from the outside while enabling sunlight to enter the room. Moreover, there is a long-felt need in the art for a specialized window cover that enables users to control the amount of sunlight that enters the room. Further, there is a long-felt need in the art for a specially designed window cover that can be tilted back away from the window to enable sunlight to enter through the window while creating a barrier that prevents direct viewing into the interior of a building or room from the outside. Furthermore, there is a long-felt need in the art for an improved window cover that replaces conventional blinds and curtains and can be operated using control buttons. Also, there is a long-felt need in the art for a window cover that is telescoping and can be easily installed on a window. Finally, there is a long-felt need in the art for an improved window cover or treatment system that can be tilted to control sunlight while also including optional components for additional privacy to balance between privacy and the desire for fresh air and sunlight.

The subject matter disclosed and claimed herein, in one embodiment thereof, comprises a telescoping window cover system for providing privacy and controlling sunlight entry. The system further features a substantially planar glass window cover. A plurality of frame brackets is attached to the window frame for attaching the window cover. A plurality of telescoping arms, including a pair of upper telescoping arms and a pair of lower telescoping arms are attached between the window frame and the window cover. A control box is disposed inside the building and coupled to the window cover for enabling extension and retraction of the telescoping arms to transition the window cover between an overlapping position and an inclined position. In the inclined position, the upper telescoping arms are longer than the lower telescoping arms, enabling the window cover to incline at approximately 45 degrees relative to the window frame, permitting sunlight and fresh air to enter while maintaining privacy. In the overlapping position, the telescoping arms are retracted and the window cover overlaps the window frame.

In this manner, the telescoping window cover system of the present invention accomplishes all of the foregoing objectives and provides users with a specially designed window cover system that improves privacy in any building while letting sunlight enter through the window. The window cover can be adjusted using a control box installed inside the building. The window cover provides a gap from the sides and top, thereby enabling sunlight to enter through the window while blocking the line of sight to provide privacy.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a window cover system. The window cover system is designed for selectively controlling sunlight entry and providing privacy for a building. The system further comprising a planar glass window cover, the window cover has a shape corresponding to a window and is dimensioned to overlap the window. A plurality of frame brackets for attaching the window cover to a window frame. A plurality of telescoping arms, including a pair of upper telescoping arms and a pair of lower telescoping arms. A control box disposed inside the building and coupled to the window cover, enabling automatic extension and retraction of the telescoping arms to transition the window cover between an overlapping position and an inclined position. In the inclined position, the upper telescoping arms are longer than the lower telescoping arms, enabling the window cover to incline at approximately 45 degrees relative to the window frame, permitting sunlight and fresh air to enter while maintaining privacy.

In a further embodiment, a control system for a window cover designed to selectively control the position of a planar glass window cover installed on a window frame is disclosed. The control system comprising a control box located inside a building and connected to the window cover, facilitating manual operation of the window cover. The control box features a plurality of control buttons for adjusting the position of the window cover. The window cover is equipped with telescoping arms, including a first telescoping arm and a second telescoping arm attached to a first longitudinal edge of the window cover, and a third telescoping arm and a fourth telescoping arm attached to a second longitudinal edge of the window cover. The control system enables the user to extend or retract the telescoping arms selectively, enabling the window cover to assume various positions, including an inclined position at approximately 45 degrees relative to the bottom edge of the window frame, a parallel position to the window frame, or any other desired position, to control sunlight entry and provide privacy within the building.

In yet another embodiment, a window cover for providing privacy while letting in sunlight is disclosed. The window cover is adapted to transition between an extended and a closed position. In the extended position, a pair of upper telescoping arms and a pair of lower telescoping arms attached to the window cover and a window frame are in an extended position. In the closed position, the pair of upper telescoping arms and the pair of lower telescoping arms are in a retracted position. A control system enables the user to extend or retract the telescoping arms selectively, enabling the window cover to transition between the extended and closed position.

In yet another embodiment, one or more privacy side members are detachably attached between the longitudinal edges of the window cover and the window frame to cover the gap between the window cover and the window frame for enhancing privacy.

In another aspect of the present invention, the window cover is made of transparent or translucent glass.

In yet another aspect, a modified window cover for blocking or letting in natural sunlight is disclosed. The cover is comprised of a table-like body with four telescoping legs, each telescoping leg is attached to a corresponding frame bracket. The bracket is installed on the window frame such that the cover extends backward up to a 45-degree angle relative to the window frame to let sunlight in while maintaining privacy. The cover can be adjusted manually or electronically via a control box.

Numerous benefits and advantages of this invention will become apparent to those skilled in the art to which it pertains upon reading and understanding the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1:
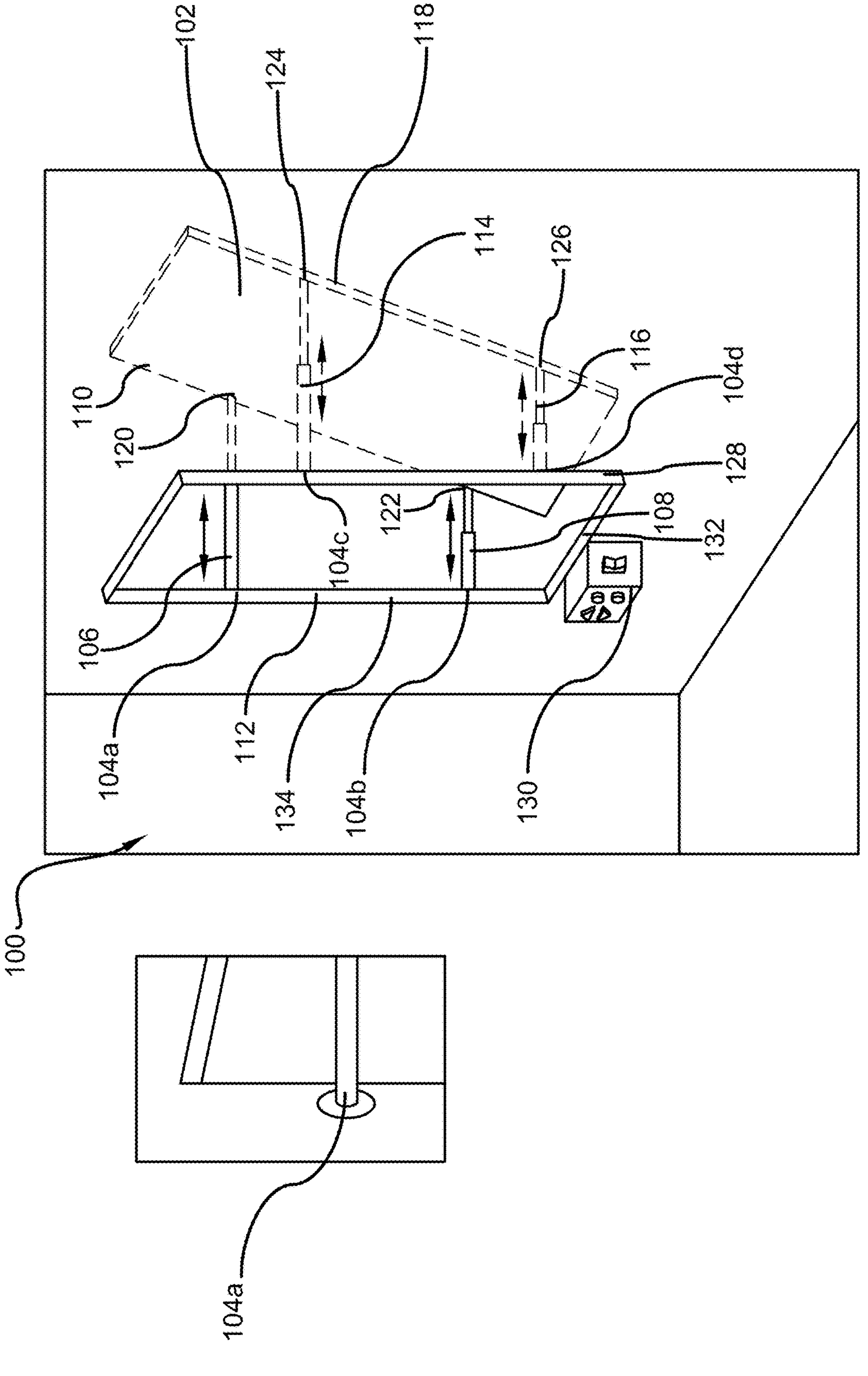
FIG. 1 illustrates a perspective view of the telescoping window cover system of the present invention installed on a window in accordance with the disclosed structure.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long-felt need in the art for an improved window cover system that helps in maintaining a trade-off between protecting privacy and enjoying natural sunlight. Additionally, there is a long-felt need in the art for a window cover system that effectively blocks the line of sight from the outside while enabling sunlight to enter the room. Moreover, there is a long-felt need in the art for a specialized window cover that enables users to control the amount of sunlight that enters the room. Further, there is a long-felt need in the art for a specially designed window cover that can be tilted back away from the window to enable sunlight while creating a barrier that prevents direct viewing into the interior of a building or room from the outside. Furthermore, there is a long-felt need in the art for an improved window cover that replaces conventional blinds and curtains and can be operated using control buttons. Also, there is a long-felt need in the art for a window cover that is telescoping and can be easily installed on a window. Finally, there is a long-felt need in the art for an improved window cover or treatment system that can be tilted to control sunlight while also including optional components for additional privacy to balance between privacy and the desire for fresh air and sunlight.

The present invention, in one exemplary embodiment, is a window cover for providing privacy while letting in sunlight and fresh air. The window cover is adapted to transition between an extended and a closed position. The window cover is planar and in the extended position, a pair of upper telescoping arms and a pair of lower telescoping arms attached to the window cover, and a window frame are in an extended position. In the closed position, the pair of upper telescoping arms and the pair of lower telescoping arms are in a retracted position. A control system enables the user to extend or retract the telescoping arms selectively, enabling the window cover to transition between the extended and closed position. In the extended position, gaps are created between the window frame and the window cover for enabling sunlight to enter into the building while providing privacy.

Referring initially to the drawings, FIG. 1 illustrates a perspective view of the telescoping window cover system of the present invention installed on a window in accordance with the disclosed structure. The window cover system 100 is designed as a modified window cover for selectively blocking or enabling sunlight to pass through the window while providing privacy for the individuals inside the building. The window cover system 100 is configured to be in an overlapping position to completely overlap and enclose a window and in an inclined position to enable sunlight to enter indoors through the window.

The system 100 includes a planar glass window cover 102 which is generally rectangular or square but can be of any geometric shape (i.e., a circle or an oblong) to match the shape and size of a window. The window cover 102 is dimensioned to overlap the window to act as a barrier between the opposite sides (inside and outside of a building) of the window and is installed on the window frame using a plurality of frame brackets 104*a-d* (hereinafter, referred to as 104). More specifically, a plurality of telescoping arms is used for extending and retracting the window cover 102 to transition between the overlapping position and the inclined position.

A first telescoping arm 106 and a second telescoping arm 108 are attached to a first longitudinal edge 110 of the window cover 102. The first telescoping arm 106 is positioned above and parallel to the second telescoping arm 108. The first telescoping arm 106 extends between the frame bracket 104*a* and a first fastening point 120 on the first longitudinal edge 110. The second telescoping arm 108 extends between the frame bracket 104*b* and a second fastening point 122 on the first longitudinal edge 110. The frame brackets 104*a*, 104*b* are fastened to the edge 112 of the window frame.

A third telescoping arm 114 and a fourth telescoping arm 116 are attached to a second longitudinal edge 118 of the window cover 102. The third telescoping arm 114 is positioned above and parallel to the fourth telescoping arm 118. The third telescoping arm 114 extends between the frame bracket 104*c* and the first fastening point 124 on the second longitudinal edge 118. The fourth telescoping arm 116 extends between the frame bracket 104*d* and the second fastening point 126 on the second longitudinal edge 118. The frame brackets 104*c*, 104*d* are fastened to the edge 128 of the window frame.

The first telescoping arm 106 and the third telescoping arm 114 are horizontally aligned (i.e., coplanar) and have the same lengths in extended and retracted positions, respectively. Further, the second telescoping arm 108 and the fourth telescoping arm 116 are horizontally aligned (i.e., coplanar) and have the same lengths in extended and retracted positions, respectively. The extended length of each of the telescoping arms 106, 114 is longer than the extended length of each of the telescoping arms 108, 116.

For extending the telescoping arms to position the window cover 102 in the extended or inclined position as illustrated in FIG. 1, a control box 130 is disposed inside the building. The control box 130 is wired or wirelessly coupled to the window cover 102 and enables the telescoping arms to automatically extend and retract. In use, the control box 130 is easily accessible to a user and includes a plurality of control buttons for operating the window cover 102 as illustrated in FIG. 2.

In the extended or inclined position of the window cover 102 as illustrated in FIG. 1, the telescoping arms 106, 114 are longer in length than the length of the telescoping arms 108, 116, thereby enabling the window cover 102 to incline at substantially 45 degrees relative to the bottom edge 132 of window frame 134. The inclined position enables sunlight and fresh air to enter through the window through the gaps maintained between the window cover 102 and the window frame 134. In the extended position, the window cover 102 also blocks the line of sight from outside, thereby maintaining privacy of the indoor space while letting in sunlight and fresh air.

Figure 4:
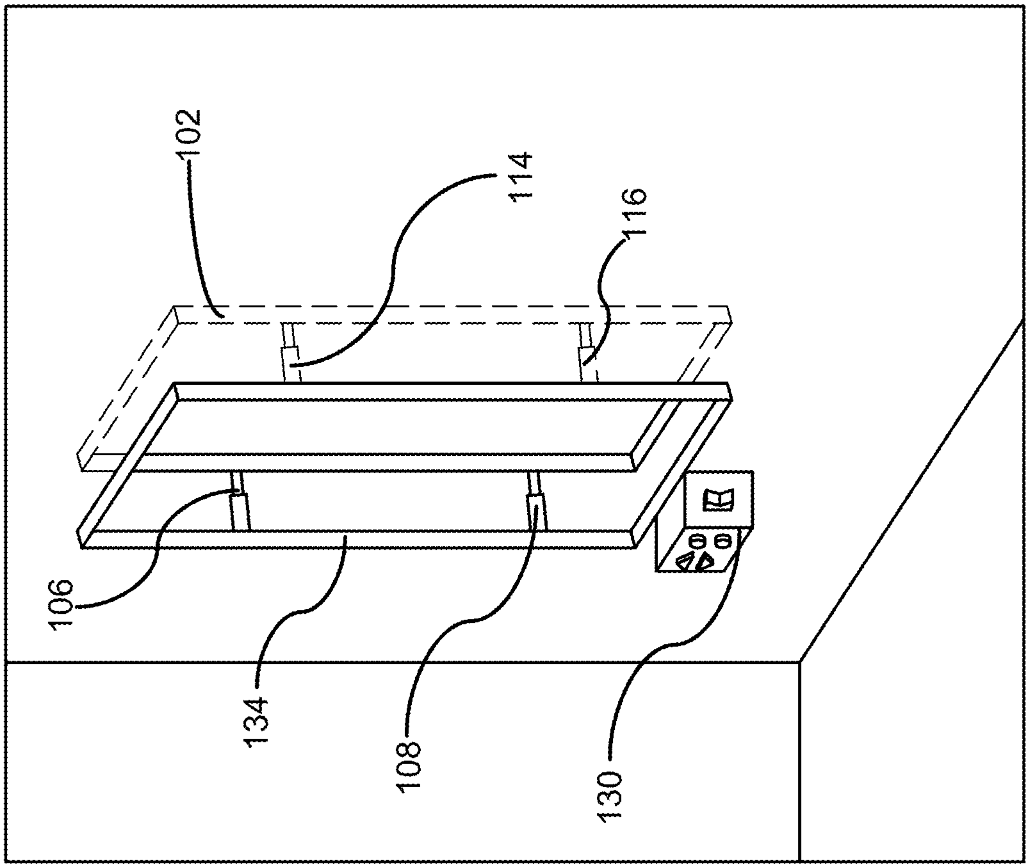
FIG. 4 illustrates a perspective view showing the window cover being positioned parallel to the window frame to block sight from outdoors in accordance with the disclosed structure.

The window cover 102 remains stable, inclined, and secure using the telescoping arms 106, 114, 108, 116. Further, the window cover 102 can be adjusted using the control box 130 as per the requirements of a user. It should be apparent to a person skilled in the art that the telescoping arms can be extended to orient the window cover 102 in different positions such as at a 45-degree angle relative to the window frame 134, parallel to the window frame 134 as illustrated in FIG. 4 or at any other position by selectively extending and retracting the upper telescoping arms 106, 114 and lower telescoping arms 108, 116.

Figure 2:
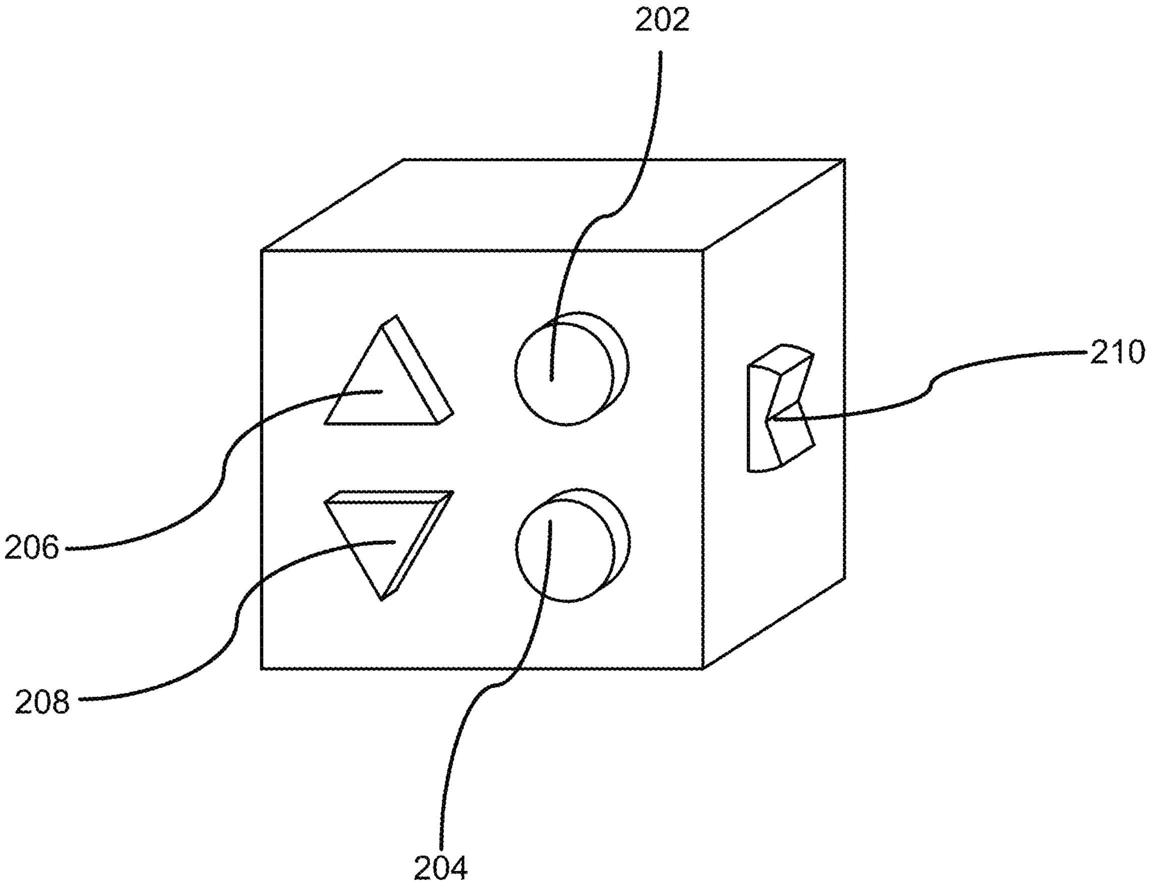
FIG. 2 illustrates a perspective view of the control box used in the telescoping window cover system of the present invention in accordance with the disclosed structure.

FIG. 2 illustrates a perspective view of the control box 130 used in the telescoping window cover system of the present invention in accordance with the disclosed structure. The control box 130 provides easy control over the operation of the window cover 102 by selectively extending and retracting the upper telescoping arms 106, 114 and the lower telescoping arms 108, 116. The first control button 202 is adapted to activate and control the upper telescoping arms 106, 114, and the second control button 204 is adapted to activate and control the lower telescoping arms 108, 116.

When the first control button 202 is pressed, the extension button 206 and the retraction button 208 are used for extending and retracting the upper telescoping arms 106, 114. Accordingly, the extension button 206, when pressed and held, extends the upper telescoping arms 106, 114 and can be extended to a desired length by a user. The extension button 206 is released to stop further extension. Similarly, the retraction button 208, when pressed and held, retracts the upper telescoping arms 106, 114.

When the second control button 204 is pressed, the extension button 206 and the retraction button 208 are used for extending and retracting the lower telescoping arms 108, 116. The extension button 206, when pressed and held, extends the lower telescoping arms 108, 116 and can be extended to a desired length by a user. The extension button 206 is released to stop further extension. Similarly, the retraction button 208, when pressed and held, retracts the lower telescoping arms 108, 116. A power button 210 is used for transitioning the window cover 102 from an extended position to a closing or overlapping position to completely close the window and to adhere the window cover 102 to the window frame 134, wherein the window cover 102 is adjacent to the window frame 134.

Figure 3:
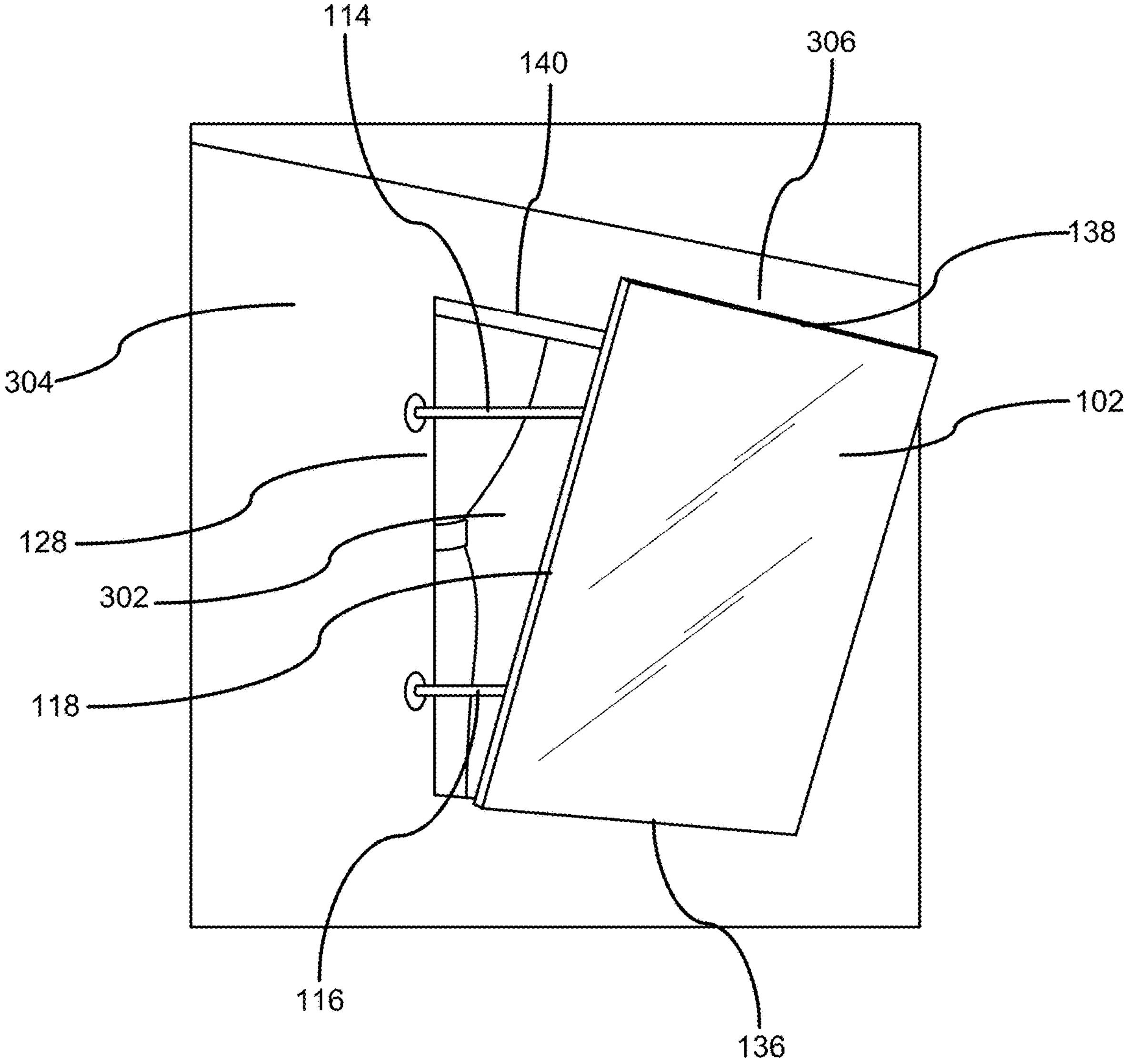
FIG. 3 illustrates a perspective view of the window cover in an extended position from the exterior of a building in accordance with the disclosed structure.

FIG. 3 illustrates a perspective view of the window cover in an extended position from the exterior of a building in accordance with the disclosed structure. Referring to FIGS. 1 and 3, the bottom edge 136 of the window cover 102 maintains a gap from the bottom edge 132 of the window frame 134. A gap 302 is maintained between the edge 118 of the cover 102 and the edge 128 of the window frame and a similar gap is maintained between the opposite edges for enabling fresh air and sunlight to enter the building 304.

The top gap 306 between the top edge 138 of the window cover 102 and the top edge 140 of the window frame 134 creates an aerodynamics for smooth flow of air into the building through the window.

FIG. 4 illustrates a perspective view showing the window cover being positioned parallel to the window frame to block sight from outdoors in accordance with the disclosed structure. As illustrated, the telescoping upper arms 106, 114 and the telescoping lower arms 108, 116 are extended to the same length using the control box 130 as described in FIG. 2. Depending on the requirements of a user, the window cover 102 can be in a parallel position to the window frame 134.

Figure 5:
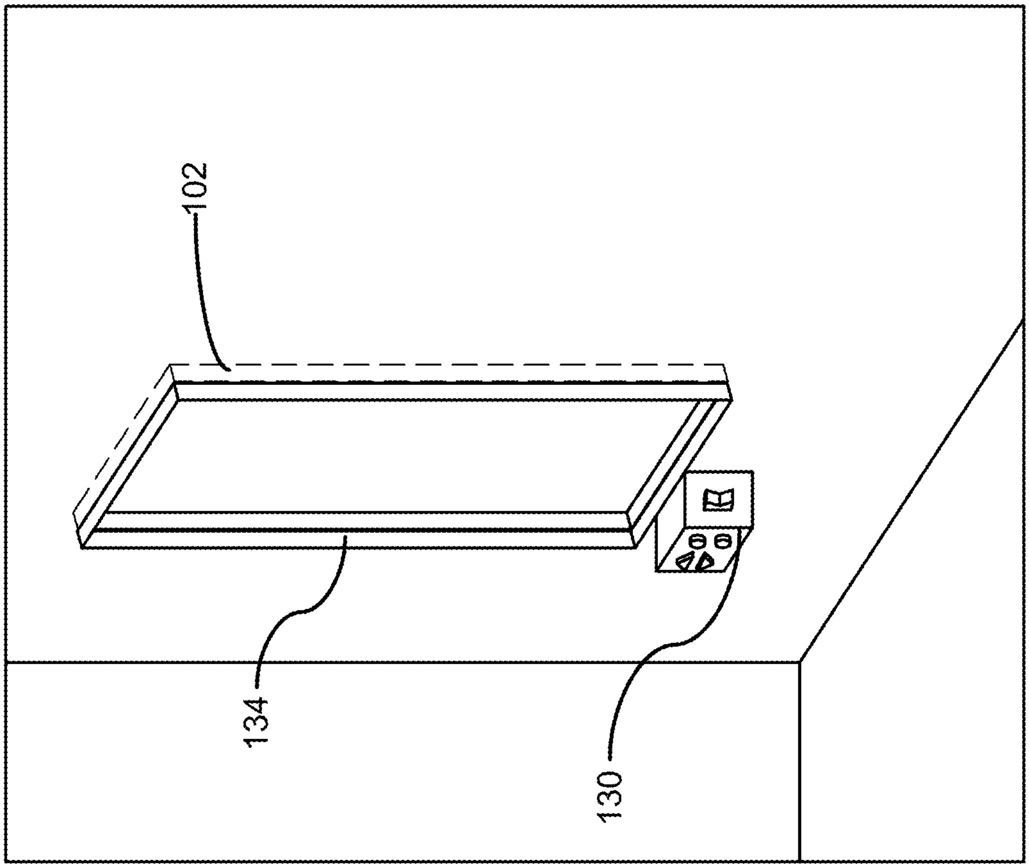
FIG. 5 illustrates a perspective view showing the window cover in a closed or overlapping position and overlapping the window frame in accordance with the disclosed structure.

FIG. 5 illustrates a perspective view showing the window cover 102 in a closed or overlapping position and overlapping the window frame in accordance with the disclosed structure. In the present embodiment, the telescoping arms 106, 114, 108, 116 are in a retracted position, thereby enabling the window cover 102 to adhere to the window frame 134 such as a conventional window cover. The window cover 102 can be brought into the closed or overlapping position by pushing the power button 210.

Figure 6:
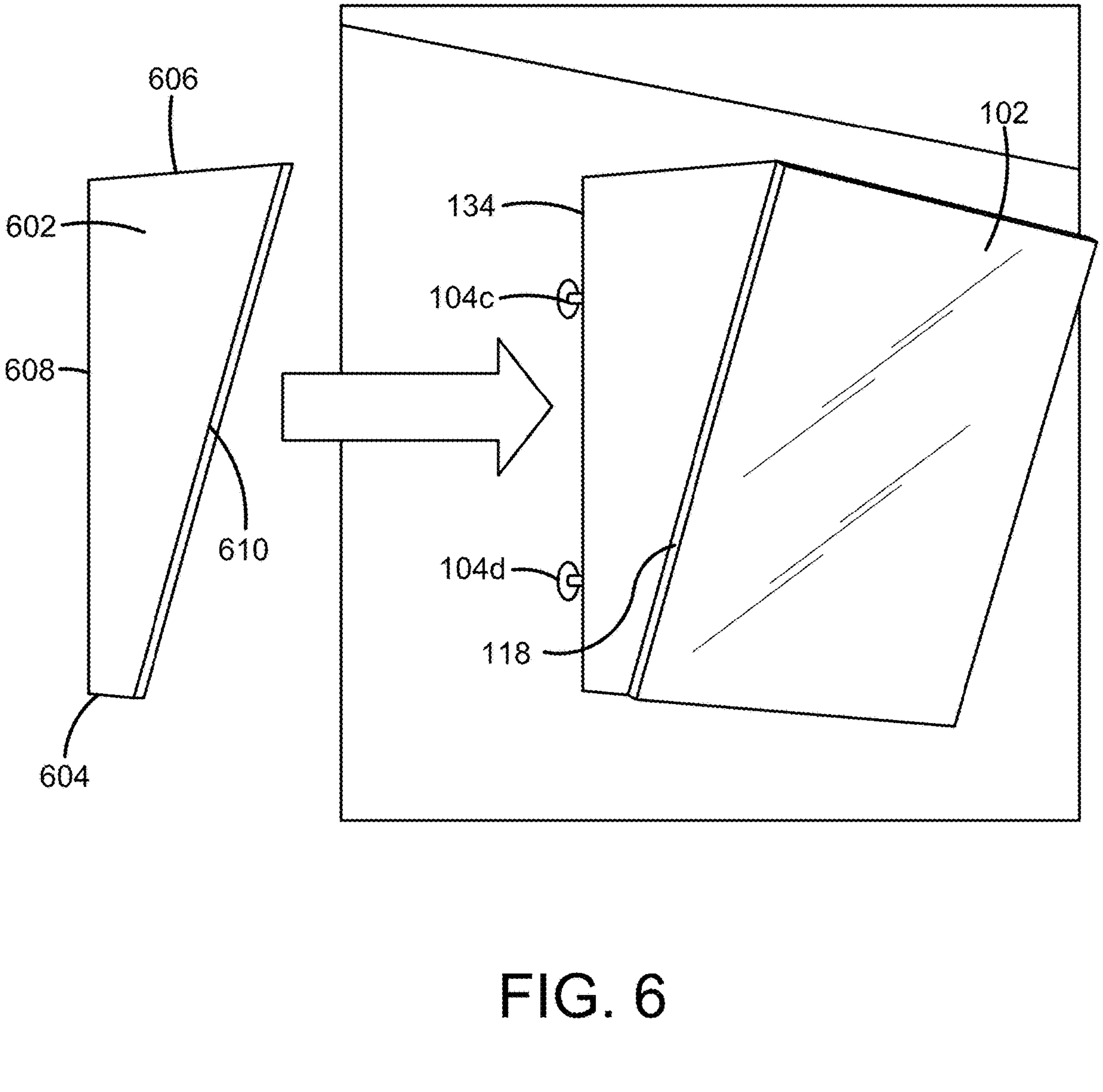
FIG. 6 illustrates a perspective view showing privacy side pieces installed in the window treatment system of the present invention for enhancing privacy of indoor area in accordance with the disclosed structure.

FIG. 6 illustrates a perspective view showing privacy side pieces installed in the window treatment system 100 of the present invention for enhancing privacy of the indoor area in accordance with the disclosed structure. The window treatment system 100 can include privacy side pieces 602 adapted to fit to close the side gaps between the window frame and the window cover 102. In the side view, only one privacy side piece 602 is shown but should be understood that a separate same side piece 602 is installed on the opposite side. The side piece 602 has a right trapezoidal shape and includes a first horizontal edge 604, a second horizontal edge 606 parallel to the first horizontal edge 604, and a pair of non-parallel longitudinal sides 608, 610. The longitudinal side 608 is designed to adhere to one of the edges of the window frame 134 and the other longitudinal side 610 adheres to the edge 118 of the window cover 102.

In one exemplary embodiment, the privacy side piece 602 is designed to cover the side gaps such as gap 302, and is adapted to be fixed as a removable attachment when the window cover 102 is in an extended position. Different sizes of the privacy side piece can be available to meet the requirements of different users. The privacy side piece 602 can be detached before retracting the window cover 102 to transition into an overlapping position. In some embodiments, the privacy side piece 602 is flexible and can be squeezed (i.e., collapsed) between the edge 118 of the window cover 102 and the window frame 134 when the telescoping arms are retracted.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "telescoping window cover system", "window cover system", "window treatment system", and "privacy screen sunlight blocker system" are interchangeable and refer to the telescoping window cover and privacy system 100 of the present invention.

Notwithstanding the foregoing, the telescoping window cover and privacy system 100 of the present invention can be of any suitable size and configuration as is known in the art without affecting the overall concept of the invention, provided that it accomplishes the above-stated objectives. One of ordinary skill in the art will appreciate that the telescoping window cover and privacy system 100 as shown in the FIGS. is for illustrative purposes only, and that many other sizes and shapes of the telescoping window cover and privacy system 100 are well within the scope of the present disclosure. Although the dimensions of the telescoping window cover and privacy system 100 are important design parameters for user convenience, the telescoping window cover and privacy system 100 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A window cover system for covering a window, the window cover system comprising:

a window cover device having a plurality of telescoping arms for selectively moving said window cover device from a first retracted position to enclose a window and a second extended position to enable sunlight to enter indoors through the window;

wherein said window cover has a planar shape selected from the group consisting of a rectangle, a square, a circle, and an oblong;

wherein said window cover in said first retracted position overlaps an exterior of a window frame to act as a barrier between the window frame and the outside environment;

wherein said plurality of telescoping arms includes a first pair of telescoping arms cover and a second pair of telescoping arms;

wherein the first pair of telescoping arms comprises a first telescoping arm attached to a first longitudinal edge of the window cover at a first fastening position and a second telescoping arm attached to the first longitudinal edge of the window cover at a second fastening position below the first fastening position; and further wherein the second pair of telescoping arms comprises a third telescoping arm attached to a second longitudinal edge of the window cover at a third fastening position and a fourth telescoping arm attached to the second longitudinal edge of the window cover at a fourth fastening position below the third fastening position; and wherein the first, second, third, and fourth telescoping arms are configured to be fastened to the window frame, and each telescoping arm can be selectively extended or retracted to a desired length.

2. The window cover system of claim 1, wherein said second extended position is an inclined position angled away from the window frame.

3. The window cover system of claim 1, wherein said second extended position is a linear position parallel to and spaced from the window frame.

4. The window cover system of claim 1, wherein said first telescoping arm and said third telescoping arm are horizontally aligned.

5. The window cover system of claim 4, wherein said second telescoping arms and said fourth telescoping arm are horizontally aligned.

6. The window cover system of claim 4, wherein said first telescoping arm and said third telescoping arm extended extend to a first length for extending said window cover to said second extended position.

7. The window cover system of claim 6, wherein said second telescoping arm and said fourth telescoping arm extended extend to a second length for extending said window cover to said second extended position.

8. The window cover system of claim 7, wherein said first length is longer than said second length.

9. The window cover system of claim 7, wherein said first length is the same as said second length.

10. A window cover system for covering a window, the window cover system comprising:

a window cover device comprising a controller and a plurality of telescoping arms for selectively moving said window cover device from a first retracted position to enclose a window and a second extended position to enable sunlight to enter indoors through the window;

wherein said window cover has a planar shape selected from the group consisting of a rectangle, a square, a circle, and an oblong;

wherein said window cover in said first retracted position overlaps an exterior of a window frame to act as a barrier between the window frame and the outside environment;

wherein said plurality of telescoping arms having includes a first pair of telescoping arms and a second pair of telescoping arms; and wherein said controller is wirelessly connected to said first pair of telescoping arms and said second pair of telescoping arms for selectively moving said window cover from said first retracted position to said second extended position;

wherein the first pair of telescoping arms comprises a first telescoping arm attached to a first longitudinal edge of the window cover at a first fastening position and a second telescoping arm attached to the first longitudinal edge of the window cover at a second fastening position below the first fastening position; and further wherein the second pair of telescoping arms comprises a third telescoping arm attached to a second longitudinal edge of the window cover at a third fastening position and a fourth telescoping arm attached to the second longitudinal edge of the window cover at a fourth fastening position below the third fastening position; and wherein the first, second, third, and fourth telescoping arms are configured to be fastened to the window frame, and each telescoping arm can be selectively extended or retracted to a desired length.

11. The window cover system of claim 10, wherein said second extended position is an inclined position angled away from the window frame.

12. The window cover system of claim 10, wherein said second extended position is a linear position parallel to and spaced from the window frame.

13. The window cover system of claim 10, wherein said first telescoping arm and said third telescoping arm extend to a first length for extending said window cover to said second extended position.

14. The window cover system of claim 13, wherein said second telescoping arm and said fourth telescoping arm extend to a second length for extending said window cover to said second extended position.

15. The window cover system of claim 14, wherein said first length is longer than said second length.

16. The window cover system of claim 14, wherein said first length is the same as said second length.

17. A window cover system for covering a window, the window cover system comprising:

a window cover device comprising a plurality of telescoping arms for selectively moving said window cover device from a first retracted position to enclose a window and a second extended position to enable sunlight to enter indoors through the window;

wherein said window cover has a planar shape including a rigid outer section and a pair of opposing flexible side sections;

wherein said window cover in said first retracted position overlaps an exterior of a window frame to act as a barrier between the window frame and the outside environment;

wherein said plurality of telescoping arms includes a first pair of telescoping arms and a second pair of telescoping arms;

wherein the first pair of telescoping arms comprises a first telescoping arm attached to a first longitudinal edge of the window cover at a first fastening position and a second telescoping arm attached to the first longitudinal edge of the window cover at a second fastening position below the first fastening position; and wherein the second pair of telescoping arms comprises a third telescoping arm attached to a second longitudinal edge of the window cover at a third fastening position and a fourth telescoping arm attached to the second longitudinal edge of the window cover at a fourth fastening position below the third fastening position; and wherein the first, second, third, and fourth telescoping arms are configured to be fastened to the window frame, and each telescoping arm can be selectively extended or retracted to a desired length; and wherein said pair of opposing flexible side sections include a first side section connecting said first longitudinal edge of said window cover to a first edge of the window frame and a second side section connecting said second longitudinal edge of said window cover to a second edge of the window frame.

* * * * *